(No Model.)

T. STURGIN.
GATE.

No. 279,039. Patented June 5, 1883.

WITNESSES:
Donn Turtchell.
C. Sedgwick

INVENTOR:
T. Sturgin
BY Munn & Co
ATTORNEYS.

UNITED STATES PATENT OFFICE.

THOMAS STURGIN, OF FAIRVIEW TOWNSHIP, MERCER COUNTY, PA.

GATE.

SPECIFICATION forming part of Letters Patent No. 279,039, dated June 5, 1883.

Application filed December 26, 1882. (No model.)

*To all whom it may concern:*

Be it known that I, THOMAS STURGIN, of Fairview township, in the county of Mercer and State of Pennsylvania, have invented certain new and useful Improvements in Gates, of which the following is a full, clear, and exact description.

This invention relates to gates which are both vertically adjustable and swinging, and are balanced by a weighted beam; and the invention consists in a novel mode of hanging said gates, substantially as hereinafter described, whereby great simplicity, durability, and ease or facility of their operation and management are obtained.

Reference is to be had to the accompanying drawings, forming a part of this specification, in which similar letters of reference indicate corresponding parts in both the figures.

Figure 1:
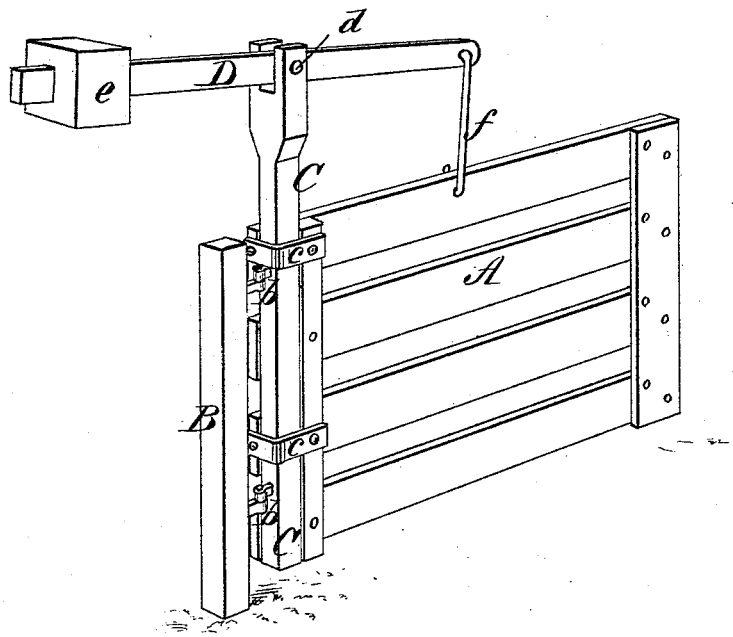
Figure 2:
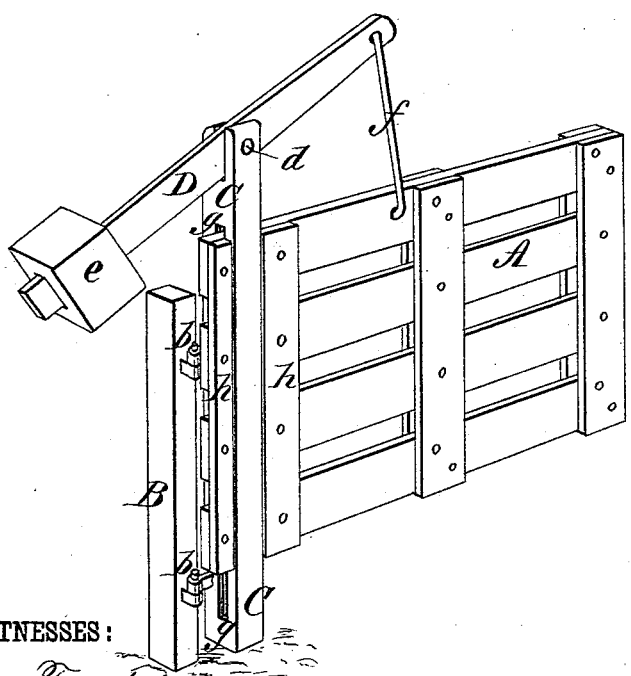

Figure 1 represents a view in perspective of a balanced swinging and vertically-adjustable gate hung in accordance with my invention, and Fig. 2 a similar view showing a modification of the same.

In Fig. 1 of the drawings, A indicates the gate, and B the post.

C is an upright slide-bar, arranged between the gate and post, and which is connected to the post by hinges $b\ b$, and with the gate by socket-straps $c\ c$, whereby provision is made for the horizontal swinging of the gate on the hinges $b\ b$, and of the upright C along with it, and for the vertical adjustment of the gate by the sockets $c\ c$ up and down the upright slide-bar C.

D is a beam or lever, pivoted at $d$ to the upper end of the bar C, above the gate, and arranged to extend both in rear of the post, on the rear end of which portion is a balance-weight, $e$, and in front of the post or over the gate, where it is connected, either by a wooden or metal connection, $f$, with the gate. This balances the gate, or nearly so, and by distributing the weight on both or opposite sides of the post restrains the post from swagging. By pivoting the beam D to the upright slide-bar C, which swings, with the gate, on the post, said beam or lever does not require to be hung upon a vertical as well as a horizontal pivot, as it would have to be if pivoted to the post B, in order to provide for its keeping in line with the gate when swinging, and an easy lifting and lowering action of the gate on the slide-bar C, without straining on the beam D or its connection with the gate, is obtained.

Fig. 2 shows a substantially-similar construction, excepting that the upright slide-bar C, which is hinged to the post B by hinges $b\ b$, has a vertical slot, $g$, in it, through which the rails of the gate A are free to slide up and down, and the gate has uprights $h\ h$ on either side of the slide-bar to connect the gate with the slide-bar and to form a sliding bearing for the gate up and down the said slide-bar C. This construction, although less simple, is equally as efficient as the arrangement shown in Fig. 1, and the beam D, with its weight $e$ and connection $f$, being pivoted at $d$ to the slide-bar C, which swings, with the gate, on the hinges $b\ b$, always preserves a like vertical position with the gate, as hereinbefore described with reference to the arrangement shown in Fig. 1.

Having thus fully described my invention, I claim as new and desire to secure by Letters Patent—

A balanced gate having the fulcrum-bar C of its counterpoise-lever connected loosely with the rear upright of gate, unattached at the lower end, and hinged to the rear gate-post, whereby the gate may be raised and swung horizontally, as described.

THOMAS STURGIN.

Witnesses:
M. L. ZAHNISER,
G. W. WORRELL.